(12) United States Patent
Yamasaki et al.

(10) Patent No.: US 8,057,676 B2
(45) Date of Patent: Nov. 15, 2011

(54) DRAINAGE WATER-TREATING METHOD

(75) Inventors: Kazuyuki Yamasaki, Hiroshima (JP);
Kazuyuki Sakata, Fukuyama (JP);
Kazumi Chuhjoh, Takamatsu (JP);
Masaki Kataoka, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 544 days.

(21) Appl. No.: 12/303,510

(22) PCT Filed: May 17, 2007

(86) PCT No.: PCT/JP2007/060127
§ 371 (c)(1),
(2), (4) Date: Dec. 4, 2008

(87) PCT Pub. No.: WO2007/142005
PCT Pub. Date: Dec. 13, 2007

(65) Prior Publication Data
US 2009/0152193 A1    Jun. 18, 2009

(30) Foreign Application Priority Data

Jun. 7, 2006  (JP) ................................. 2006-157955

(51) Int. Cl.
*C02F 3/00* (2006.01)
(52) U.S. Cl. ........ 210/615; 210/616; 210/617; 210/618; 210/620; 210/631; 210/694
(58) Field of Classification Search .......... 210/615–618, 210/620, 631, 694, 908, 915
See application file for complete search history.

(56) References Cited

U.S. PATENT DOCUMENTS

| | | | | |
|---|---|---|---|---|
| 3,763,040 | A | * | 10/1973 | Timpe et al. ................... 210/667 |
| 4,983,299 | A | * | 1/1991 | Lupton et al. ................. 210/617 |
| 5,057,221 | A | * | 10/1991 | Bryant et al. ................. 210/610 |
| 5,254,253 | A | * | 10/1993 | Behmann ....................... 210/607 |
| 6,056,876 | A | | 5/2000 | Yamasaki et al. |
| 6,228,267 | B1 | | 5/2001 | Yamasaki et al. |
| 2003/0085172 | A1 | | 5/2003 | Yamasaki et al. |
| 2006/0054205 | A1 | | 3/2006 | Yabe et al. |

FOREIGN PATENT DOCUMENTS

| | | |
|---|---|---|
| GB | 2 381 794 A | 5/2003 |
| JP | 63-54998 A | 3/1988 |
| JP | 7-51686 A | 2/1995 |
| JP | 10-15348 A | 1/1998 |
| JP | 11-267677 A | 10/1999 |
| JP | 2001-302551 A | 10/2001 |
| JP | 2003-80290 A | 3/2003 |
| JP | 2003-136087 A | 5/2003 |
| JP | 2003-334548 A | 11/2003 |
| JP | 2004-121962 A | 4/2004 |
| JP | 2004-267869 A | 9/2004 |
| JP | 2004-321959 A | 11/2004 |
| JP | 2007-75723 A | 3/2007 |

* cited by examiner

*Primary Examiner* — Chester Barry
(74) *Attorney, Agent, or Firm* — Birch, Stewart, Kolasch & Birch, LLP

(57) ABSTRACT

Drainage water containing an organofluorine compound is introduced into a raw tank (1) and then filtered through a filtration device (4). Next, a microorganism, a micro-nanobubbling auxiliary agent and a nutrient are added thereto in a first transit tank (5) while micro-nanobubbles are generated thereinto by a micro-nanobubbling machine (7), thereby giving treated water. This treated water is then fed into an active carbon column (14) and then the above-described organofluorine compound contained in the treated water is decomposed by the microorganism as described above.

2 Claims, 8 Drawing Sheets

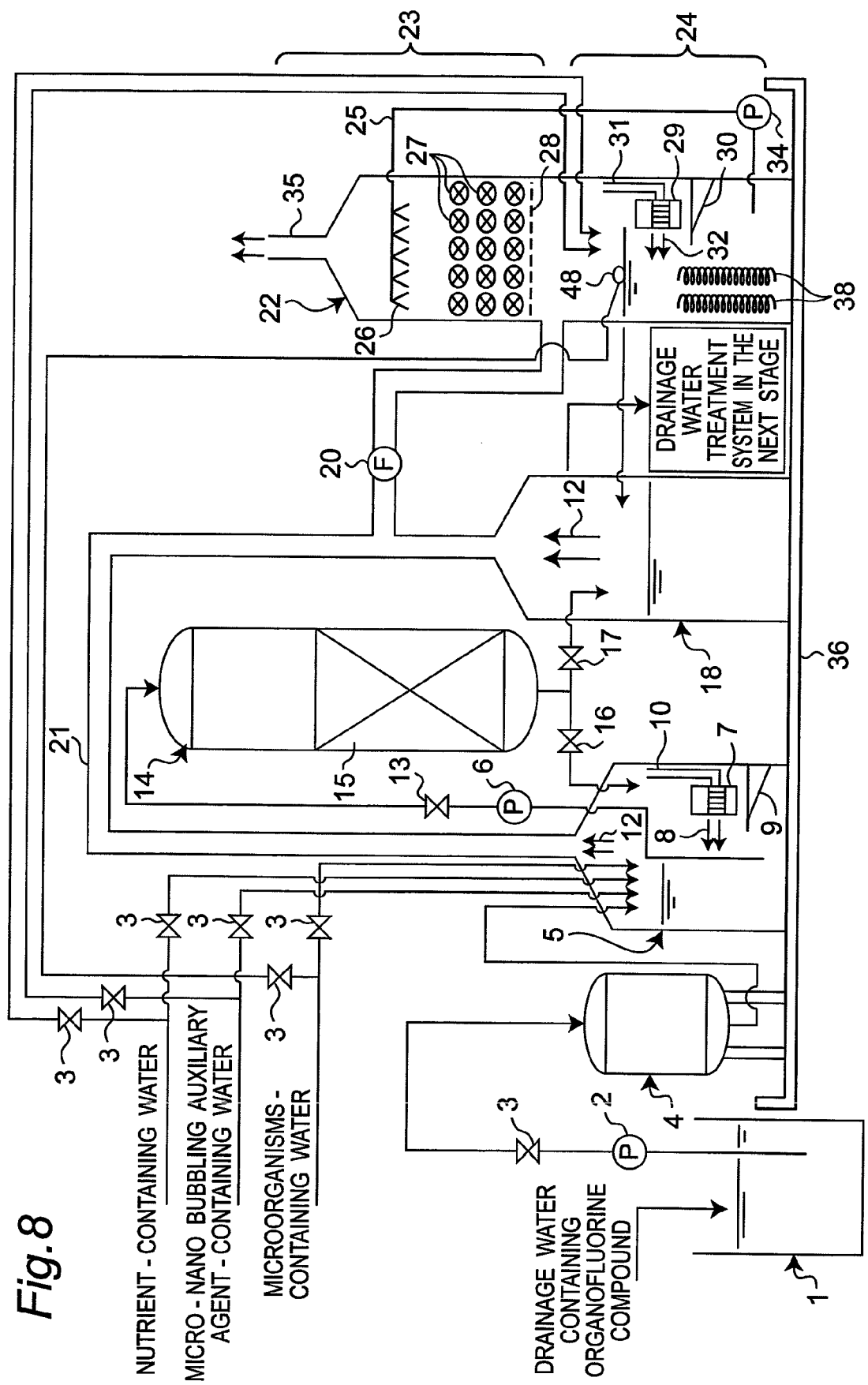

DRAINAGE WATER-TREATING METHOD

TECHNICAL FIELD

The present invention relates to a drainage water-treating method and a drainage water-treating apparatus for use, for example, not only in semiconductor plants and liquid crystal plants but also in plants for producing or using organofluorine compounds.

BACKGROUND ART

Organofluorine compounds are chemically stable substances. The organofluorine compounds, in particular, have good properties in terms of heat resistance and chemical resistance. Therefore, the organofluorine compounds are used as surfactants and the like.

However, the organofluorine compounds are chemically stable substances, and therefore hardly decomposed with microorganisms. The organofluorine compounds, for example perfluorooctane sulfonate (PFOS) and perfluorooctanoate (PFOA) are hardly decomposed in the ecosystem, so that there have been concerns about harmful influence to the ecosystem. Heat decomposition of PFOS or PFOA requires high temperature of about 1000° C. or more due to the chemical stability (see JP 2001-302551 A).

DISCLOSURE OF THE INVENTION

Subject to be Solved by the Invention

An object of the present invention is to provide a drainage water-treating method and a drainage water-treating apparatus which can effectively decompose persistent organofluorine compounds with use of microorganisms.

Means for Solving the Subjects

To achieve the above object, the present invention provides a drainage water-treating method, comprising the steps of:
propagating microorganisms on active carbon, the microorganisms having been activated with micro-nano bubbles and a nutrient; and
bringing drainage water containing organofluorine compounds into contact with the active carbon so as to absorb the organofluorine compounds in the drainage water to the active carbon, and then to decompose the organofluorine compounds absorbed into the active carbon with use of the microorganisms.

The micro-nano bubbles are herein defined as air bubbles having a diameter of 10 μm to around several hundred nm. The nutrient refers to a nutrient necessary for activating microorganisms. The organofluorine compounds refer to, for example, perfluorooctane sulfonate (PFOS), perfluorooctanoate (PFOA), and perfluoroalkyl sulfonates (PFAS).

The drainage water-treating method of the invention includes a step for propagating microorganisms activated with micro-nano bubbles and a nutrient on active carbon, and a step for bringing drainage water containing organofluorine compounds into contact with the active carbon so as to absorb the organofluorine compounds in the drainage water to the active carbon and to decompose the organofluorine compounds absorbed into the active carbon by the microorganisms. Therefore, the microorganisms can effectively decompose persistent organofluorine compounds (e.g., perfluorooctane sulfonate (PFOS), perfluorooctanoate (PFOA) and perfluoroalkyl sulfonates (PFAS)) contained in the drainage water.

Since the microorganisms decompose the the active carbon can automatically be regenerated. As a consequence, the necessity for regenerating the active carbon is eliminated, and maintenance costs and running costs can be reduced thereby.

The present invention also provides a drainage water-treating apparatus, comprising:
active carbon onto which microorganisms activated with micro-nano bubbles and a nutrient are propagated, wherein
the active carbon is brought into contact with drainage water containing organofluorine compounds so as to absorb the organofluorine compounds in the drainage water, and then to decompose the absorbed organofluorine compounds with use of the microorganisms.

The micro-nano bubbles are herein defined as air bubbles having a diameter of 10 μm to around several hundred nm. The nutrient refers to a nutrient necessary for activating microorganisms. The organofluorine compounds refer to, for example, perfluorooctane sulfonate (PFOS), perfluorooctanoate (PFOA), and perfluoroalkyl sulfonates (PFAS).

The drainage water-treating apparatus of the invention includes active carbon onto which microorganisms are activated and propagated with micro-nano bubbles and a nutrient. The active carbon is brought into contact with drainage water containing organofluorine compounds so as to absorb the organofluorine compounds in the drainage water, and to decompose the absorbed organofluorine compounds with use of the microorganisms. Therefore, the microorganisms persistent can effectively decompose organofluorine compounds (e.g., perfluorooctane sulfonate (PFOS), perfluorooctanoate (PFOA) and perfluoroalkyl sulfonates (PFAS)) contained in the drainage water.

Since the microorganisms decompose the organofluorine compounds absorbed into the active carbon, the active carbon can automatically be regenerated. As a consequence, the necessity for regenerating the active carbon is eliminated, and maintenance costs and running costs can be reduced thereby.

The present invention further provides a drainage water-treating method, comprising the steps of:
filtering drainage water containing organofluorine compounds;
mixing microorganisms, a micro-nano bubble generation auxiliary agent and a nutrient into the filtered drainage water while adding micro-nano bubbles to the filtered drainage water so as to produce treatment water; and
feeding the treatment water to an active carbon tower which houses active carbon so as to decompose the organofluorine compounds in the treatment water with use of the microorganisms.

The micro-nano bubbles are herein defined as air bubbles having a diameter of 10 μm to around several hundred nm. The micro-nano bubble generation auxiliary agent refers to an auxiliary agent which can maintain the generation state of micro-nano bubbles stable. The nutrient refers to a nutrient necessary for activating microorganisms. The organofluorine compounds refer to, for example, perfluorooctane sulfonate (PFOS), perfluorooctanoate (PFOA), and perfluoroalkyl sulfonates (PFAS).

The drainage water-treating method of the invention includes a step for filtering drainage water containing organofluorine compounds, a step for mixing microorganisms, a micro-nano bubble generation auxiliary agent and a nutrient into the filtered drainage water while adding micro-nano bubbles therein to produce treatment water, and a step for feeding the treatment water to an active carbon tower which houses active carbon so as to decompose the organofluorine compounds in the treatment water with use of the microorganisms. Therefore, the microorganisms can be propagated on the active carbon in the active carbon tower which is an immobilization support of the microorganisms, and can be further activated with the micro-nano bubbles and the nutrient, so that the organofluorine compounds can rationally be decomposed. Moreover, the micro-nano bubble generation auxiliary agent is added so that an optimum amount of the micro-nano bubbles for activating the microorganisms can be generated.

Thus, the microorganisms can effectively decompose persistent organofluorine compounds (e.g., perfluorooctane sulfonate (PFOS), perfluorooctanoate (PFOA) and perfluoroalkyl sulfonates (PFAS)) contained in the drainage water.

Since the microorganisms can decompose the organofluorine compounds absorbed into the active carbon, the active carbon can automatically be regenerated. As a consequence, the necessity for regenerating the active carbon is eliminated, and maintenance costs and running costs can be reduced thereby.

The present invention further provides a drainage water-treating apparatus, comprising:
 a filtration device for filtering drainage water containing organofluorine compounds; and
 an active carbon tower for housing active carbon,
 wherein the drainage water containing organofluorine compounds is filtered through the filtration device, and then microorganisms, a micro-nano bubble generation water while micro-nano bubbles are added to the drainage water to produce treatment water, and
 wherein the treatment water is fed to the active carbon tower so as to decompose the organofluorine compounds in the treatment water with use of the microorganisms.

The micro-nano bubbles are herein defined as air bubbles having a diameter of 10 µm to around several hundred nm. The micro-nano bubble generation auxiliary agent refers to an auxiliary agent which can maintain the generation state of micro-nano bubbles stable. The nutrient refers to a nutrient necessary for activating microorganisms. The organofluorine compounds refer to, for example, perfluorooctane sulfonate (PFOS), perfluorooctanoate (PFOA), and perfluoroalkyl sulfonates (PFAS).

The drainage water-treating apparatus of the invention includes a filtration device for filtering drainage water containing organofluorine compounds, and an active carbon tower housing active carbon. Drainage water containing organofluorine compounds is filtered through the filtration device, and then microorganisms, a micro-nano bubble generation auxiliary agent and a nutrient are mixed added to the drainage water to produce treatment water. The treatment water is fed to the active carbon tower so as to decompose the organofluorine compounds in the treatment water with use of the microorganisms. Therefore, the microorganisms can be propagated on the active carbon in the active carbon tower which is an immobilization support of the microorganisms, and can be further activated with the micro-nano bubbles and the nutrient. Thereby the organofluorine compounds can rationally be decomposed. Moreover, the micro-nano bubble generation auxiliary agent is added so that an optimum amount of the micro-nano bubbles for activating the microorganisms can be generated.

Therefore, the microorganisms can effectively decompose persistent organofluorine compounds (e.g., perfluorooctane sulfonate (PFOS), perfluorooctanoate (PFOA) and perfluoroalkyl sulfonates (PFAS)) contained in the drainage water.

Since the microorganisms can decompose the organofluorine compounds absorbed into the active carbon, the active carbon can automatically be regenerated. As a consequence, the necessity for regenerating the active carbon is eliminated, and maintenance costs and running costs can be reduced thereby.

In one embodiment, the drainage water-treating apparatus comprises:
 an exhaust gas treatment tank which houses a micro-nano bubble generator,
 wherein microorganisms, a micro-nano bubble generation auxiliary agent and a nutrient are added to the water introduced into the exhaust gas treatment tank while micro-nano bubbles are also added to the water by the micro-nano bubble generator to produce cleaning water, and
 wherein exhaust gas generated by decomposing the organofluorine compounds in the treatment water with use of the microorganisms in the active carbon tower is introduced into the exhaust gas treatment tank so as to be treated with the cleaning water.

The drainage water-treating apparatus in this embodiment includes an exhaust gas treatment tank which houses a micro-nano bubble generator. Microorganisms, a micro-nano bubble generation auxiliary agent and a nutrient are added to the water introduced into the exhaust gas treatment tank while micro-nano bubbles are also added to the water by the micro-nano bubble generator to produce cleaning water. Exhaust gas, which is generated by decomposing the organofluorine compounds in the treatment water with use of the microorganisms in the active carbon tower, is introduced into the exhaust gas treatment tank and is treated with the cleaning water. Therefore, fluoride in the exhaust gas can rationally be treated with the activated microorganisms in the cleaning water.

In one embodiment, the drainage water-treating apparatus comprises:
 a raw water tank which is connected to the filtration device and which receives the drainage water containing organofluorine compounds;
 a first relay tank which is placed between the filtration device and the active carbon tower and connected to them and which has the micro-nano bubble generator; and
 a second relay tank connected to the active carbon tower and the exhaust gas treatment tank,
 wherein the drainage water containing organofluorine compounds introduced into the raw water tank is filtered through the filtration device, and then the microorganisms, the micro-nano bubble generation auxiliary agent and the nutrient are mixed into the drainage water in the first relay tank while micro-nano bubbles are added to the drainage water by the micro-nano bubble generator to produce treatment water,
 wherein the treatment water is fed to the active carbon tower, and the treatment water and the exhaust gas passing through the active carbon tower are introduced into the second relay tank or the raw water tank so as to be separated into the treatment water and the exhaust gas, and
 wherein the exhaust gas is introduced into the exhaust gas treatment tank.

In the drainage water-treating apparatus of the embodiment, the treatment water and the exhaust gas passing through the active carbon tower are introduced into the second relay tank or the raw water tank so as to be separated into the treatment water and the exhaust gas. Therefore, the treatment water and the exhaust gas can be treated individually and reliably.

In the case of introducing the treatment water and the exhaust gas passing through the active carbon tower into the raw water tank, the treatment water can repeatedly be treated.

In the drainage water-treating apparatus of one embodiment, the exhaust gas treatment tank has:

a lower reservoir section placed on a lower portion thereof for housing the micro-nano bubble generator and reserving the cleaning water; and an upper spray section placed on an upper portion thereof for spraying the cleaning water pumped up from the lower reservoir section, wherein the cleaning water sprayed from the upper spray section washes the exhaust gas and is reserved in the lower reservoir section before being pumped up again to the upper spray section.

In the drainage water-treating apparatus of the embodiment, the cleaning water can be cyclically used between the upper spray section and the lower reservoir section because the cleaning water sprayed from the upper spray section washes the exhaust gas and is reserved in the lower reservoir section before being pumped up again to the upper spray section.

In the drainage water-treating apparatus of one embodiment, the active carbon tower houses a filler in addition to the active carbon.

In the drainage water-treating apparatus in this embodiment, the active carbon tower houses a filler in addition to the active carbon, so that the microorganisms are propagated on the filler. Thereby, the organofluorine compounds absorbed into the active carbon can efficiently be decomposed with these microorganisms.

In the drainage water-treating apparatus of one embodiment, the second relay tank houses a micro-nano bubble generator.

In the drainage water-treating apparatus in this embodiment, the second relay tank houses a micro-nano bubble generator. Therefore, a slight amount of the organofluorine compounds in the treatment water which has passed through the active carbon tower can also be decomposed and treated with microorganisms activated in the second relay tank.

In the drainage water-treating apparatus of one embodiment, the filler is a polyvinylidene chloride filler.

In the drainage water-treating apparatus in this embodiment, the filler is a polyvinylidene chloride filler, so that the microorganisms activated on the polyvinylidene chloride filler can be cultivated at a high concentration. Also, the organofluorine compounds absorbed into the active carbon can be treated with more efficiency. Since the polyvinylidene chloride filler is commercially available, it can easily be obtained at low cost.

In the drainage water-treating apparatus of one embodiment, the polyvinylidene chloride filler has a string shape.

In the drainage water-treating apparatus of the embodiment, the polyvinylidene chloride filler has a string shape, so that a lot of the polyvinylidene chloride fillers can be housed in the active carbon tower.

In the drainage water-treating apparatus of one embodiment, the polyvinylidene chloride filler has a ring shape.

In the drainage water-treating apparatus of the embodiment, the polyvinylidene chloride filler has a ring shape, so that the polyvinylidene chloride filler can easily be housed in the active carbon tower.

In the drainage water-treating apparatus of one embodiment, the first relay tank houses a filler.

In the drainage water-treating apparatus in this embodiment, the first relay tank 1 houses a filler, so that the microorganisms can be propagated on the filler while being immobilized thereon, and the organofluorine compounds in the treatment water before being fed to the active carbon tower can be decomposed and treated with these microorganisms.

In the drainage water-treating apparatus of one embodiment, the filler is a polyvinylidene chloride filler.

In the drainage water-treating apparatus of the embodiment, the filler is a polyvinylidene chloride filler, so that activated microorganisms can be cultivated at a high concentration in the polyvinylidene chloride filler. Thereby the organofluorine compounds in the treatment water can be treated in the first relay tank 1 with more efficiency. Since the polyvinylidene chloride filler is commercially available, it can easily be obtained at low cost.

In the drainage water-treating apparatus of one embodiment, the polyvinylidene chloride filler has a string shape.

In the drainage water-treating apparatus of the embodiment, the polyvinylidene chloride filler ha a string shape, so that a lot of the polyvinylidene chloride fillers can be housed in the first relay tank 1.

In the drainage water-treating apparatus of one embodiment, the polyvinylidene chloride filler has a ring shape.

In the drainage water-treating apparatus of the embodiment, the polyvinylidene chloride filler has a ring shape, so that the polyvinylidene chloride filler can easily be housed in the first relay tank.

In the drainage water-treating apparatus of one embodiment, the lower reservoir section of the exhaust gas treatment tank houses a filler.

In the drainage water-treating apparatus of the embodiment, the filler is housed in the lower reservoir section of the exhaust gas treatment tank, so that the microorganisms are propagated on the filler. Thereby the cleaning water which has absorbed the organic matter in the exhaust gas can be treated in the lower reservoir section. Specifically, the microorganisms propagated and activated on the filler can decompose the organofluorine compounds in the cleaning water.

In the drainage water-treating apparatus of one embodiment, the filler is a polyvinylidene chloride filler.

In the drainage water-treating apparatus of the embodiment, the filler is a polyvinylidene chloride filler, so that activated microorganisms can be cultivated at a high concentration in the polyvinylidene chloride filler. Thereby the organofluorine compounds in the treatment water can be treated in the exhaust gas treatment tank with more efficiency. Since the polyvinylidene chloride filler is commercially available, it can easily be obtained at low cost.

In the drainage water-treating apparatus of one embodiment, the polyvinylidene chloride filler has a string shape.

In the drainage water-treating apparatus of the embodiment, the polyvinylidene chloride filler has a string shape, so that a lot of the polyvinylidene chloride fillers can be housed in the exhaust gas treatment tank.

In the drainage water-treating apparatus of one embodiment, the polyvinylidene chloride filler has a ring shape.

In the drainage water-treating apparatus of the embodiment, the polyvinylidene chloride filler has a ring shape, so that the polyvinylidene chloride filler can easily be housed in the exhaust gas treatment tank.

In the drainage water-treating apparatus of one embodiment, the filtration device, the first relay tank, the active carbon tower, the second relay tank and the exhaust gas treatment tank are mounted on a unit stand.

In the drainage water-treating apparatus in the embodiment, the filtration device, the first relay tank, the active carbon tower, the second relay tank and the exhaust gas treatment tank are mounted on a unit stand. Consequently, the filtration device, the first relay tank, the active carbon tower, the second relay tank and the exhaust gas treatment tank can easily be transported with a track or the like in the state of being mounted on the unit stand. This allows quick installation and reduced startup time.

In the drainage water-treating apparatus of one embodiment, the filtration device, the first relay tank, the active carbon tower, the second relay tank, and the exhaust gas treatment tank are made of resin.

In the drainage water-treating apparatus in the embodiment, the filtration device, the first relay tank, the active carbon tower, the second relay tank and the exhaust gas treatment tank are made of resin. Therefore, the filtration device, the first relay tank, the active carbon tower, the second relay tank and the exhaust gas treatment tank can be made lightweight, so that they can be transported more easily.

In the drainage water-treating apparatus of one embodiment, the micro-nano bubble generator is a submerged pump-type micro-nano bubble generator.

In the drainage water-treating apparatus of this embodiment, the micro-nano bubble generator is a submerged pump-type micro-nano bubble generator, so that a large amount of micro-nano bubbles can be easily generated.

Effect of the Invention

The drainage water-treating method of the invention includes a step for propagating microorganisms activated with micro-nano bubbles and a nutrient on active carbon, and a step for bringing drainage water containing organofluorine compounds into contact with the active carbon so as to absorb the organofluorine compounds in the drainage water to the active carbon and to decompose the organofluorine compounds absorbed into the active carbon by the microorganisms. Therefore, it becomes possible to effectively decompose persistent organofluorine compounds with microorganisms.

The drainage water-treating apparatus of the invention includes active carbon onto which microorganisms are activated and propagated with micro-nano bubbles and a nutrient. The active carbon is brought into contact with drainage water containing organofluorine compounds so as to absorb the organofluorine compounds in the drainage water, and to decompose the absorbed organofluorine compounds with the microorganisms. Thus, it becomes possible to effectively decompose persistent organofluorine compounds with use of microorganisms.

BRIEF DESCRIPTION OF DRAWINGS

FIG. 8 shows a schematic view of a drainage water-treating apparatus in an eighth embodiment of the invention.

BEST MODE FOR CARRYING OUT THE INVENTION

Hereinbelow, the present invention will be described in detail in conjunction with the embodiments with reference to the drawings.

First Embodiment

Figure 1:
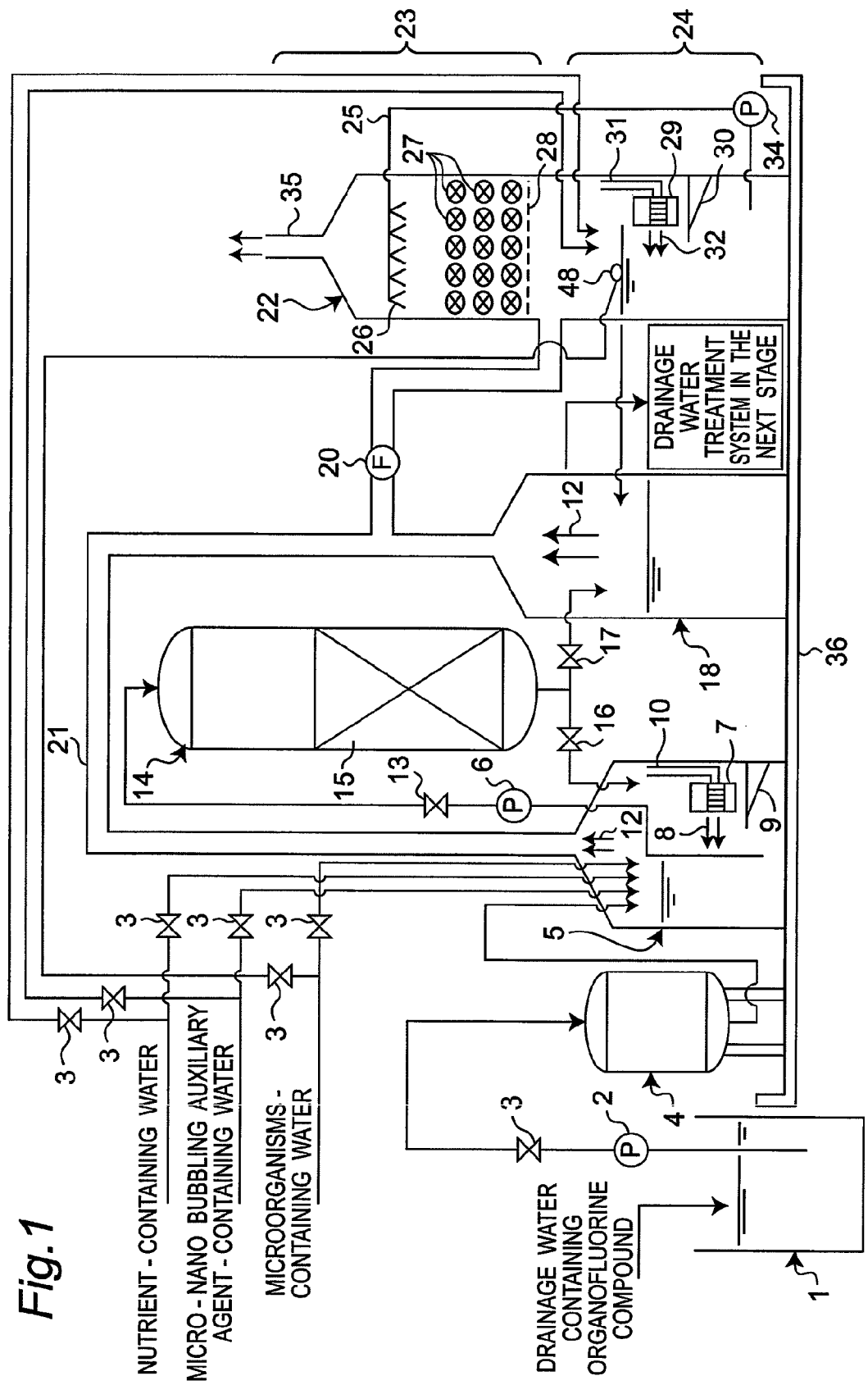
FIG. 1 shows a schematic view of a drainage water-treating apparatus in a first embodiment of the invention.

FIG. 1 shows a schematic view of a drainage water-treating apparatus in the first embodiment of the present invention. This drainage water-treating apparatus has a raw water tank 1 for receiving drainage water containing organofluorine compounds, a filtration device 4 for filtering the drainage water, a first relay tank 5 having a micro-nano bubble generator 7, an active carbon tower 14 for housing active carbon, a second relay tank 18, and an exhaust gas treatment tank 22 for housing a micro-nano bubble generator 29.

The raw water tank 1 is connected to the filtration device 4. The first relay tank 5 is placed between the filtration device 4 and the active carbon tower 14 and connected to them. The second relay tank 18 is connected to the active carbon tower 14 and the exhaust gas treatment tank 22.

The drainage water is introduced into the raw water tank 1 and filtered through the filtration device 4. Then, microorganisms, a micro-nano bubble generation auxiliary agent and a nutrient are mixed into the drainage water in the first relay tank 5, while micro-nano bubbles are added to the drainage water by the micro-nano bubble generator 7 so as to produce treatment water.

The treatment water is fed to the active carbon tower 14 so as to decompose the organofluorine compounds in the treatment water with use of the microorganisms.

Specifically, the microorganisms activated with the micro-nano bubbles and the nutrient are propagated on the active carbon in the active carbon tower 14. The drainage water contacts active carbon so as to absorb the organofluorine compounds in the drainage water, and then the absorbed organofluorine compounds are decomposed by the microorganisms.

The treatment water and the exhaust gas, which have passed through the active carbon tower 14, are introduced into the second relay tank 18 where they are separated into the treatment water and the exhaust gas. The exhaust gas is introduced into the exhaust gas treatment tank 22.

Microorganisms, a micro-nano bubble generation auxiliary agent and a nutrient are added to the water introduced into the exhaust gas treatment tank 22 while micro-nano bubbles are also added to the water by the micro-nano bubble generator 29 to produce cleaning water.

Exhaust gas, which has been generated by decomposing the organofluorine compounds in the treatment water with use of the microorganisms in the active carbon tower 14, is introduced into the exhaust gas treatment tank 22 so as to be treated with the cleaning water.

The micro-nano bubble generation auxiliary agent refers to an auxiliary agent which can maintain a stable generation state of micro-nano bubbles. The nutrient refers to a nutrient necessary to activate microorganisms, which mainly includes nitrogen and/or phosphorus as an ingredient, and a minute amount of potassium, magnesium and calcium. The organofluorine compounds are, for example, perfluorooctane sulfonate (PFOS), perfluorooctanoate (PFOA), and perfluoroalkyl sulfonates (PFAS).

The raw water tank 1 is provided with a raw water tank pump 2. The drainage water, the flow rate of which is adjusted with a valve 3, is introduced into the filtration device 4. The filtration device 4 is, for example, a rapid filter which is filled with anthracite as a coal-based filter medium.

The first relay tank 5 receives water containing the microorganisms, water containing the micro-nano bubble generation auxiliary agent, and water containing the nutrient with their flow rate adjusted by the valve 3. The first relay tank 5 receives the drainage water introduced from the filtration device 4.

The micro-nano bubble generator 7 is fixed onto a mount 9 provided in the first relay tank 5. The micro-nano bubble generator 7 may be placed on the bottom of the first relay tank 5.

The micro-nano bubble generator 7 is a submerged pump-type micro-nano bubble generator. The micro-nano bubble generator 7 may be a micro-nano bubble generator having no function of a submerged pump. In such a case, however, the micro-nano bubble generator needs a circulating pump.

An air suction pipe 10 is connected to the micro-nano bubble generator 7. The micro-nano bubble generator 7 sucks air from the air suction pipe 10 so as to create an ultra-high-speed spiral flow of water and air. This results in generation of micro-nano bubbles after the lapse of a definite period of time.

As the micro-nano bubble generator 7, any commercially available devices may be adopted without limitation to manufacturers. However, specifically, they are made by Nomura Electronics Co., Ltd. or Aura Tec Corporation, for example.

The micro-nano bubbles are defined as air bubbles having a diameter of 10 μm to several hundred nm. Normal-sized bubbles (air bubbles) ascend in water, reach the top of water, and finally burst to disappear. Micro bubbles are defined as air bubbles which have the size of 10 to several dozen μm. Micro bubbles are reduced in size underwater, and disappear (completely dissolved) in the end. Nano bubbles are defined as air bubbles having a diameter of several hundred nm or less. Nano bubbles can exist in water permanently. The micro-nano bubbles are bubbles that the micro bubbles and the nano bubbles are mixed together.

Inside the first relay tank 5, optimal micro-nano bubbles are generated from the micro-nano bubble generator 7 by adding the micro-nano bubble generation auxiliary agent after the lapse of a definite period of time.

A water stream 8 is generated by fine bubbles discharged from the micro-nano bubble generator 7. The water stream 8 becomes a circulating water stream in the first relay tank 5, which stream agitates the content of the first relay tank 5. Specifically, the water stream 8 mixes the drainage water containing organofluorine compounds, the micro-nano bubble generation auxiliary agent, the microorganisms and the nutrient. The microorganisms activated with the micro-nano bubbles are further activated by adding the nutrient.

A first relay tank pump 6 is placed outside the first relay tank 5. A flow rate of the treatment water in the first relay tank 5 is adjusted by the valve 13, and then the treatment water is introduced into the upper portion of the active carbon tower 14 by the first relay tank pump 6.

The active carbon tower 14 has an active carbon layer 15. The active carbon layer 15 is filled with active carbon. The active carbon is, for example, a coconut shell active carbon or a coal-based active carbon. Whether the coconut shell active carbon is selected or the coal-base active carbon is selected may be determined on the basis of types and shapes of the active carbon or the introduction amount of the treatment water, through conduction of treatment experiments.

The microorganisms activated by micro-nano bubbles are propagated on the active carbon in the active carbon tower 14. These microorganisms decompose the organofluorine compounds. Decomposition of the organofluorine compounds generates gas containing fluoride, which flows out of the lower portion of the active carbon tower 14 together with the treatment water.

In the case where microorganisms do not sufficiently propagate on the active carbon, continuous introduction of water into the active carbon may deteriorate the capability of the active carbon to absorb the organic matter. However, when the activity ratio of the microorganisms propagating on the active carbon is high, the active carbon is regenerated so that the organic matter absorbed on the active carbon is decomposed.

Conventionally, in the water purification plants for water service, an organic load of influent water is low, and therefore the active carbon has been naturally regenerated by microorganisms. On the other hand, in drainage water, since an organic load is rather high, the active carbon has been rarely regenerated.

In the present invention, the microorganisms in the treatment water are activated with use of micro-nano bubbles, so that the microorganisms are propagated on the active carbon as an immobilization support. As a consequence, the active carbon having the propagated microorganisms becomes what is called a biological active carbon. The biological active carbon is strong and has automatic regeneration capability, even if drainage water has a high organic load. This requires no regeneration of the active carbon in the active carbon tower 14, which reduces maintenance costs and running costs.

The first relay tank 5 and the second relay tank 18 are connected to the exhaust gas treatment tank 22 via ducts 21. The first relay tank 5 and the second relay tank 18 are connected to the active carbon tower 14 via pipes.

The active carbon tower 14 has a branch line on the downstream side. One end of the branch line is connected to the first relay tank 5 via a valve 16. The other end of the branch line is connected to the second relay tank 18 via a valve 17.

A part of the treatment water and the exhaust gas containing fluoride discharged from the active carbon tower 14 is returned to the first relay tank 5 while the other part thereof are introduced into the second relay tank 18.

The introduction amount of the treatment water to the second relay tank 18 is determined by analyzing the treatment water from the active carbon tower 14 to the second relay tank 18. When the water quality is worse than a target value, the valves 16 and 17 are adjusted so as to increase the amount of the treatment water returned to the first relay tank 5. When the water quality is better than the target value, the valves 16 and 17 are adjusted so as to increase the amount of the treatment water introduced to the second relay tank 18.

The treatment water coming out of the relay tank 18 is treated in a drainage water-treatment system in the next stage, depending on the content (i.e., water quality) of the treatment water. In most cases, drainage water-treatment system in the next stage.

Exhaust gas 12 (shown by an arrow) containing fluoride in both the first relay tank 5 and the second relay tank 18 is introduced into the exhaust gas treatment tank 22 via the duct 21 having a fan 20.

The exhaust gas treatment tank 22 has a lower reservoir section 24 located in the lower portion thereof, and has an upper spray section 23 located in the upper portion thereof.

The lower reservoir section 24 houses the micro-nano bubble generator 29 and reserves the cleaning water. The upper spray section 23 sprays the cleaning water pumped up from the lower reservoir section 24.

The cleaning water sprayed from the upper spray section 23 washes the exhaust gas. Then, the cleaning water is reserved in the lower reservoir section 24 before being pumped up again to the upper spray section 23 via a spray pump 34.

The upper spray section 23 has a porous plate 28, a plastic filler 27 (e.g., brand name Tellerette), and a water spray nozzles 26 in this order from the lower side to the upper side. An exhaust outlet 35 is located above the water spray nozzle 26 provided in the upper spray section 23.

The exhaust gas containing fluoride flows into the exhaust gas treatment tank 22 from the duct 21 provided between the upper spray section 23 and the lower reservoir section 24. The exhaust gas is then washed by the cleaning water sprayed from the water spray nozzle 26, and thereafter discharged from the exhaust outlet 35.

The micro-nano bubble generator 29 is housed in the lower reservoir section 24. The micro-nano bubble generator 29 has the same structure as the micro-nano bubble generator 7. Therefore, the explanation thereof will be omitted.

The micro-nano bubble generator 29 is fixed onto a mount 30 provided in the exhaust gas treatment tank 22.

The micro-nano bubble generator 29 is connected to an air suction pipe 31. The micro-nano bubble generator 29 sucks air from the air suction pipe 31 so as to create an ultra-high-speed spiral flow of the water with air, which results in generation of micro-nano bubbles.

The lower reservoir section 24 of the exhaust gas treatment tank 22 receives water containing the micro-nano bubble generation auxiliary agent, water containing the microorganisms, and water containing the nutrient while their flow rates are adjusted by the valves 3.

Inside the exhaust gas treatment tank 22, optimal micro-nano bubbles are generated from the micro-nano bubble generator 29 with addition of the micro-nano bubble generation auxiliary agent.

A water stream 32 is generated by fine bubbles discharged from the micro-nano bubble generator 29. The water stream 32 becomes a circulating water stream in the exhaust gas treatment tank 22, which stream agitates the content of the exhaust gas treatment tank 22. Specifically, the water stream 32 mixes the cleaning water, the micro-nano bubble generation auxiliary agent, the microorganisms and the nutrient. The microorganisms activated by the micro-nano bubbles are further activated by adding the nutrient.

The cleaning water in the lower reservoir section 24 is sprayed from the water spray nozzle 26 of the upper spray section 23 by the spray pump 34 via a cleaning water pipe 25.

In comparison between cleaning water containing micro-nano bubbles and cleaning water not containing micro-nano bubbles, it has been confirmed through experiments that the cleaning water containing micro-nano bubbles has higher in removal rate of the organofluorine compounds than the cleaning water not containing micro-nano bubbles.

For the reason thereof, it is thought that gas in the cleaning water containing micro-nano bubbles increases the cleaning effect on fouling components.

Therefore, when an evaporable or easily gasified organofluorine compound is generated, the compound is absorbed by cleaning water and is decomposed by the microorganisms activated by micro-nano bubbles in the lower reservoir section 24.

Conventionally, industrial water and the like have generally been used as makeup water. In the invention, microorganisms content water, which contains various kinds of microorganisms, is used as makeup water to the scrubber-type exhaust gas treatment tank 22.

After start of operation, the cleaning water in the exhaust gas treatment tank 22 evaporates or blows out through the exhaust outlet 35, so that the cleaning water decreases. A ball tap 48 is provided for automatically feeding makeup water so as to maintain the fluid level of the lower reservoir section 24. The exhaust gas containing fluoride treated in the exhaust gas treatment tank 22 dissolves in cleaning water, so that the cleaning water becomes drainage water containing fluorine which is treated in a drainage water-treatment system in the next stage.

The drainage water-treatment system in the next stage includes a chelating resin tower and/or a coagulation and settling facility. Drainage water is treated in the chelating resin tower in the case where fluorine concentrations of the treatment water and the cleaning water are low. Drainage water is treated in the coagulation and settling facility in the case where fluorine concentrations of the treatment water and the cleaning water are high. In other words, the following treatment is determined on the basis of the fluorine concentrations of the treatment water and the cleaning water.

The filtration device 4, the first relay tank 5, the active carbon tower 14, the second relay tank 18, and the exhaust gas treatment tank 22 are mounted on a unit stand 36. The filtration device 4, the first relay tank 5, the active carbon tower 14, the second relay tank 18, and the exhaust gas treatment tank 22 are preferably made of resin.

Description is now given on a drainage water-treating method with use of the above-structured drainage water-treating apparatus.

Drainage water containing organofluorine compounds is filtered. Microorganisms, a micro-nano bubble generation auxiliary agent, and a nutrient are mixed into the filtered drainage water, while micro-nano bubbles are added therein to produce treatment water. The treatment water is then fed to the active carbon tower 14 housing active carbon so as to decompose the organofluorine compounds in the treatment water with use of the microorganisms.

Specifically, the microorganisms, which have been activated with the micro-nano bubbles and the nutrient, are propagated on the active carbon. The drainage water containing organofluorine compounds is brought into contact with the active carbon, so that the active carbon absorbs the organofluorine compounds in the drainage water and that the organofluorine compounds absorbed into the active carbon are decomposed by the microorganisms.

The above-structured drainage water-treating apparatus has active carbon onto which microorganisms are propagated, wherein the microorganisms are activated with micro-nano bubbles and a nutrient. The active carbon is brought into contact with drainage water containing organofluorine compounds so as to absorb the organofluorine compounds in the drainage water, so that the absorbed organofluorine compounds are decomposed by the microorganisms. Therefore, the microorganisms can effectively decompose persistent organofluorine compounds (e.g., perfluorooctane sulfonate (PFOS), perfluorooctanoate (PFOA) and perfluoroalkyl sulfonates (PFAS)) contained in the drainage water.

Since the microorganisms decompose the organofluorine compounds absorbed into the active carbon, the active carbon can automatically be regenerated. As a consequence, the necessity for regenerating the active carbon is eliminated, so that maintenance costs and running costs can be reduced thereby.

The drainage water-treating apparatus also has a filtration device 4 for filtering drainage water containing organofluorine compounds, and has an active carbon tower 14 for housing active carbon. The drainage water containing organofluorine compounds is filtered through the filtration device 4. Then, microorganisms, a micro-nano bubble generation auxiliary agent and a nutrient are mixed into the drainage water while micro-nano bubbles are added thereto to produce treatment water. The treatment water is fed to the active carbon tower 14 so as to decompose the organofluorine compounds in the treatment water with use of the microorganisms. Therefore, the microorganisms can be propagated on the active carbon in the active carbon tower 14 which is an immobilization support of the microorganisms, and can be further activated with the micro-nano bubbles and the nutrient. Therefore, the organofluorine compounds can rationally be decomposed. Moreover, the micro-nano bubble generation auxiliary agent is added so as to generate an optimum amount of the micro-nano bubbles for activating the microorganisms.

Thus, the microorganisms can effectively decompose persistent organofluorine compounds, such as perfluorooctane sulfonate (PFOS), perfluorooctanoate (PFOA) and perfluoroalkyl sulfonates (PFAS)), can be contained in the drainage water.

Since the microorganisms decompose the organofluorine compounds absorbed into the active carbon, the active carbon can automatically be regenerated. As a consequence, the necessity for regenerating the active carbon is eliminated, and maintenance costs and running costs can be reduced thereby.

The drainage water-treating apparatus also has an exhaust gas treatment tank 22 which houses a micro-nano bubble generator 29. Microorganisms, a micro-nano bubble generation auxiliary agent and a nutrient are added to the drainage water in the exhaust gas treatment tank 22 while micro-nano bubbles are also added thereto by the micro-nano bubble generator 29 to produce cleaning water. Exhaust gas, which is generated by decomposing the organofluorine compounds in the treatment water with use of the microorganisms in the active carbon tower 14, is introduced into the exhaust gas treatment tank 22 so as to be treated with the cleaning water. Therefore, fluoride in the exhaust gas can rationally be treated with the activated microorganisms in the cleaning water.

The treatment water and the exhaust gas passing through the active carbon tower 14 are introduced into the second relay tank 18 and are separated into the treatment water and the exhaust gas. Thus, the treatment water and the exhaust gas can be treated individually and reliably.

The cleaning water sprayed from the upper spray section 23 washes the exhaust gas and is reserved in the lower reservoir section 24 before being pumped up again to the upper spray section 23. Thus, the cleaning water can be cyclically used between the upper spray section 23 and the lower reservoir section 24.

The filtration device 4, the first relay tank 5, the active carbon tower 14, the second relay tank 18, and the exhaust gas treatment tank 22 are mounted on the unit stand 36. Therefore, the filtration device 4, the first relay tank 5, the active carbon tower 14, the second relay tank 18, and the exhaust gas treatment tank 22 can easily be transported with a track or the like in the state of being mounted on the unit stand 36. This allows quick installation and reduced startup time.

The filtration device 4, the first relay tank 5, the active carbon tower 14, the second relay tank 18, and the exhaust gas treatment tank 22 are made of resin. Therefore, the filtration device 4, the first relay tank 5, the active carbon tower 14, the second relay tank 18, and the exhaust gas treatment tank 22 are light in weight, so that they can be transported more easily.

The micro-nano bubble generators 7, 29 are submerged pump-type micro-nano bubble generators, so that a large amount of micro-nano bubbles can be easily generated.

Second Embodiment

Figure 2:
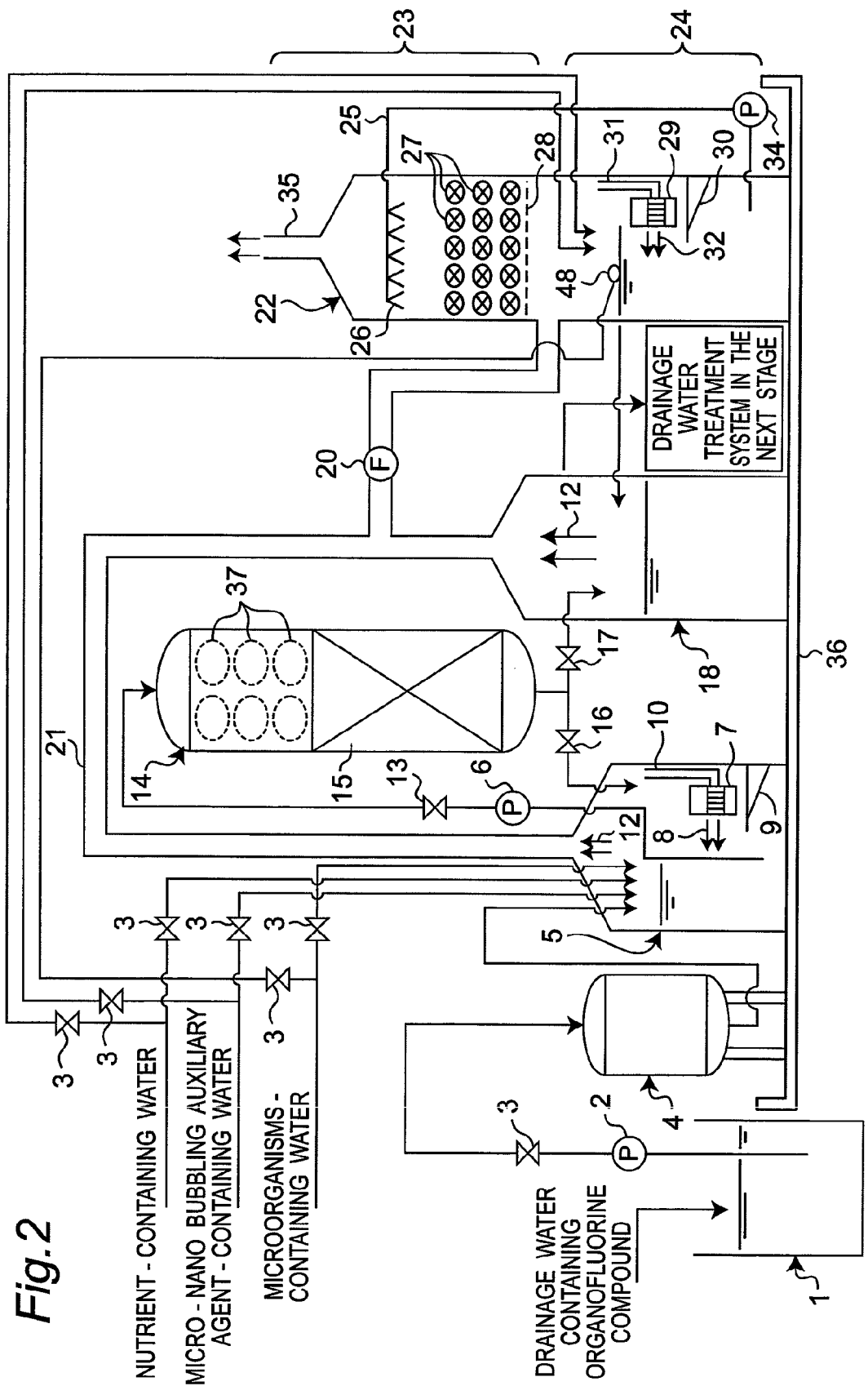
FIG. 2 shows a schematic view of a drainage water-treating apparatus in a second embodiment of the invention.

FIG. 2 shows a drainage water-treating apparatus in the second embodiment of the invention. The second embodiment is different from the first embodiment shown in FIG. 1 in the point that the active carbon tower 14 houses a ring-shaped polyvinylidene chloride filler 37 as a filler, in addition to the active carbon. In this second embodiment, component members identical to those in the first embodiment are designated by identical reference numerals, and the explanation thereof is omitted.

Specifically, an upper portion of the active carbon layer 15 is filled with the ring-shaped polyvinylidene chloride filler 37. Therefore, a large amount of microorganisms which have been activated by micro-nano bubbles propagate in the ring-shaped polyvinylidene chloride filler 37.

Some of microorganisms, which have propagated at a high concentration in the ring-shaped polyvinylidene chloride filler 37, exfoliate from the ring-shaped polyvinylidene chloride filler 37 and move to the active carbon layer 15. Thus, a large amount of microorganisms also propagate on the active carbon of the active carbon layer 15.

To be brief, it has been found out that the organofluorine compounds can be absorbed into the active carbon and then be decomposed by the activated microorganisms. Thus, the organofluorine compounds are effectively decomposed by the combination of the ring-shaped polyvinylidene chloride filler 37 in the upper portion and the active carbon layer 15 in the lower portion in the active carbon tower 14. It is also effective to create water circulation in which the treatment water is repeatedly passed between the first relay tank 5 and the active carbon tower 14.

The active carbon tower 14 houses the active carbon and the ring-shaped polyvinylidene chloride filler 37. The microorganisms are propagated in the ring-shaped polyvinylidene chloride filler 37, and these microorganisms can efficiently decompose the organofluorine compounds absorbed into the active carbon.

The activated microorganisms can be cultivated at a high concentration in the ring-shaped polyvinylidene chloride filler 37. This makes it possible to more efficiently treat the organofluorine compounds absorbed into the active carbon. The ring-shaped polyvinylidene chloride filler 37 can easily be obtained at low cost because it is commercially available.

The polyvinylidene chloride filler 37 can easily be housed in the active carbon tower 14 because the ring-shaped polyvinylidene chloride filler 37 has a ring shape.

Third Embodiment

Figure 3:
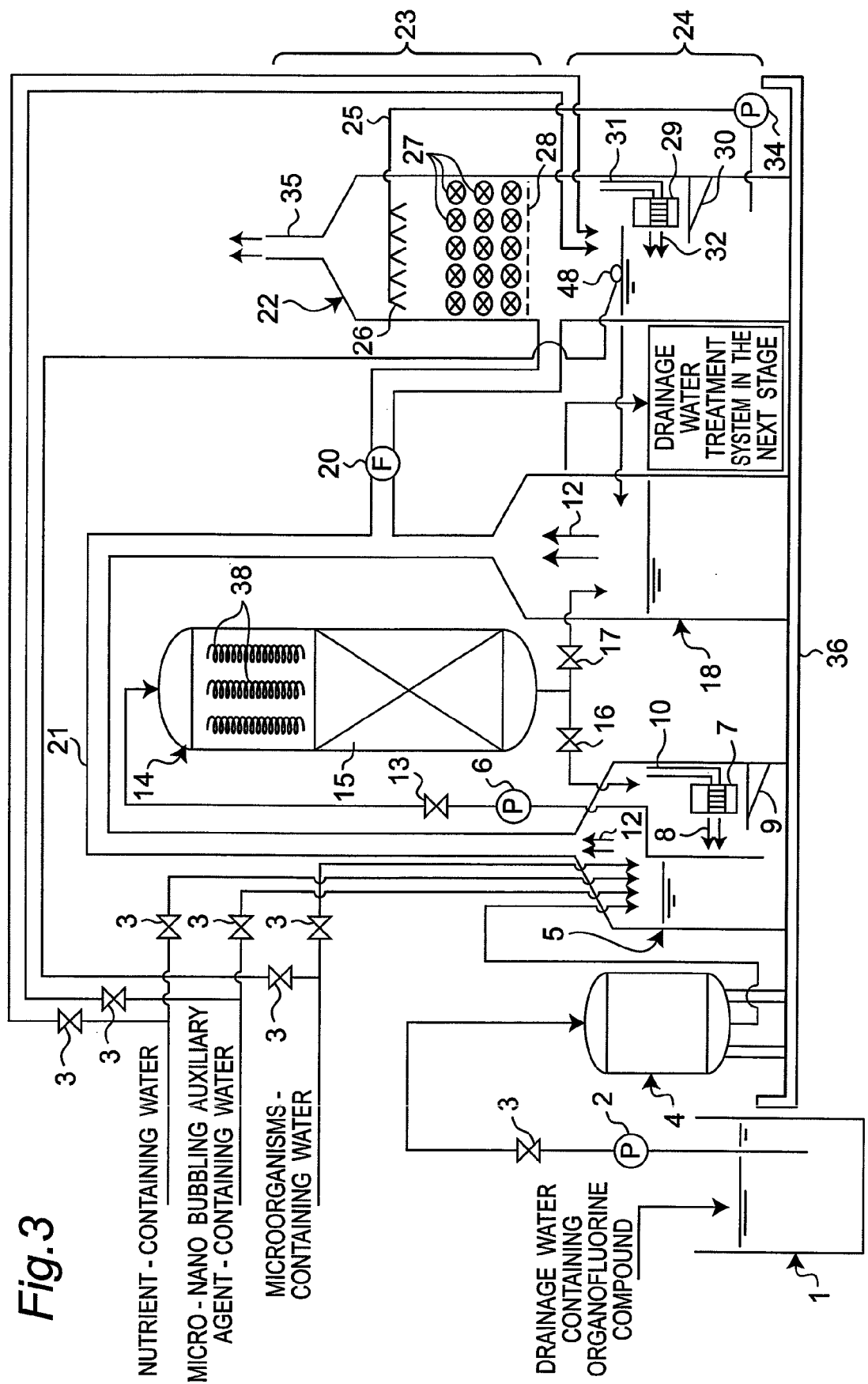
FIG. 3 shows a schematic view of a drainage water-treating apparatus in a third embodiment of the invention.

FIG. 3 shows a drainage water-treating apparatus in the third embodiment of the invention. The third embodiment is different from the first embodiment shown in FIG. 1 in the point that the active carbon tower 14 houses a string-shaped polyvinylidene chloride filler 38 as a filler, in addition to the active carbon. In the third embodiment, component members identical to those in the first embodiment are designated by identical reference numerals, and the explanation thereof is omitted.

An upper portion of the active carbon layer 15 is filled with the string-shaped polyvinylidene chloride filler 38. A large amount of microorganisms which have been activated by micro-nano bubbles propagate in the string-shaped polyvinylidene chloride filler 38.

Some of microorganisms, which have propagated at a high concentration in the string-shaped polyvinylidene chloride filler 38, exfoliate from the ring-shaped polyvinylidene chloride filler 38 and move to the active carbon layer 15. Thereby a large amount of microorganisms also propagate on the active carbon of the active carbon layer 15.

To be brief, it has been found out that the organofluorine compounds can be absorbed into the active carbon and then be decomposed by the activated microorganisms. Thus, the organofluorine compounds are effectively decomposed by the combination of the string-shaped polyvinylidene chloride filler 38 in the upper portion and the active carbon layer 15 in the lower portion in the active carbon tower 14. It is also effective to create water circulation in which the treatment water is repeatedly passed between the first relay tank 5 and the active carbon tower 14.

The active carbon tower 14 houses the string-shaped polyvinylidene chloride filler 38 in addition to the active carbon. Therefore, the microorganisms are propagated in the string-shaped polyvinylidene chloride filler 38, and can efficiently decompose the organofluorine compounds absorbed into the active carbon.

The activated microorganisms can be cultivated at a high concentration in the ring-shaped polyvinylidene chloride filler 38. This makes it possible to more efficiently affect the organofluorine compounds absorbed into the active carbon. The string-shaped polyvinylidene chloride filler 38 can easily be obtained at low cost because it is commercially available.

A lot of the ring-shaped polyvinylidene chloride fillers 38 can easily be housed in the active carbon tower 14 because the string-shaped polyvinylidene chloride filler 38 has a string shape.

Fourth Embodiment

Figure 4:
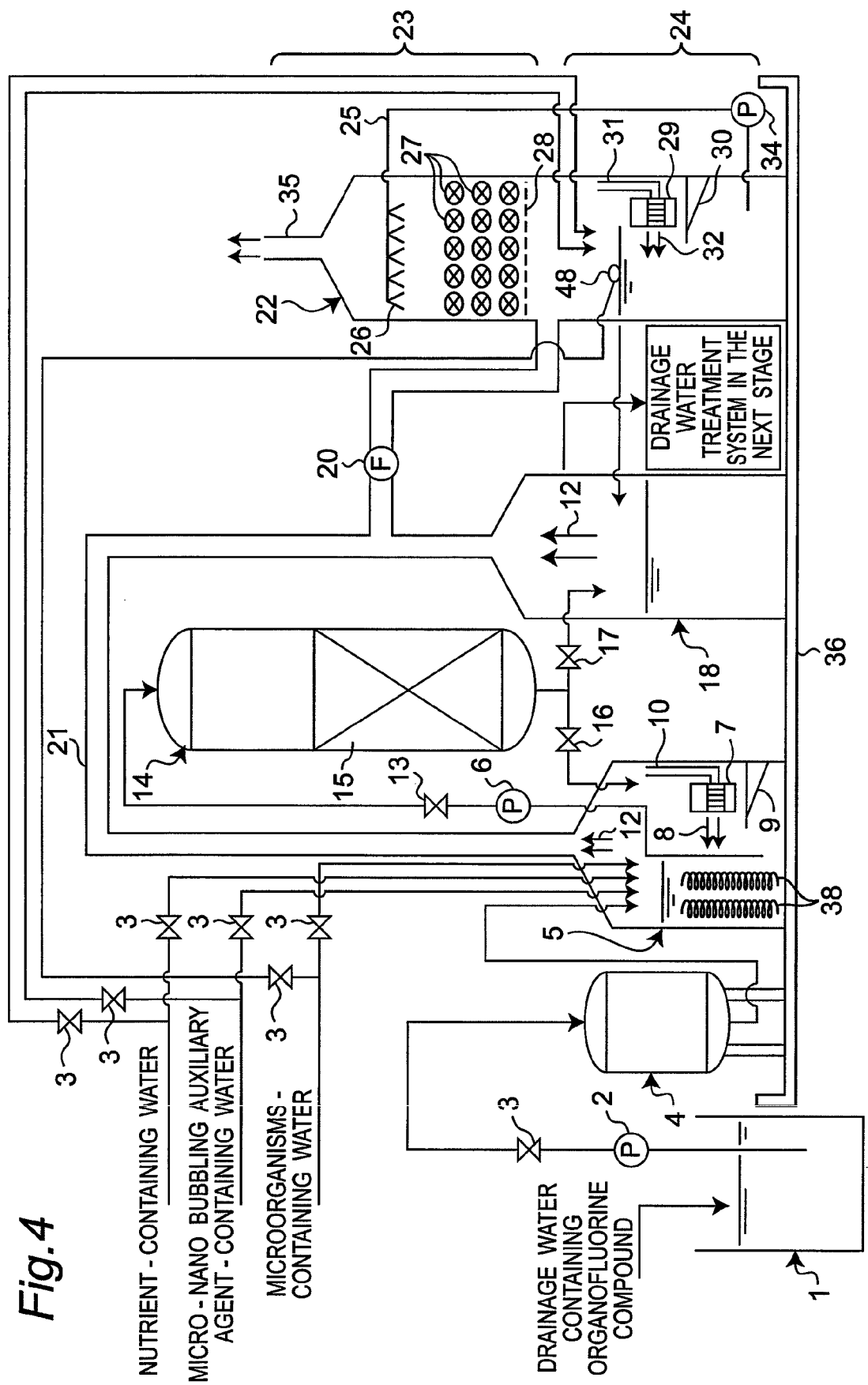
FIG. 4 shows a schematic view of a drainage water-treating apparatus in a fourth embodiment of the invention.

FIG. 4 shows a drainage water-treating apparatus in the fourth embodiment of the invention. The fourth embodiment is different from the first embodiment shown in FIG. 1 in the point that the first relay tank 5 houses a string-shaped polyvinylidene chloride filler 38 as a filler. In the fourth embodiment, component members identical to those in the first embodiment are designated by identical reference numerals, and the explanation thereof is omitted.

A large amount of microorganisms which have been activated by micro-nano bubbles propagate in the string-shaped polyvinylidene chloride filler 38.

Some of microorganisms, which have propagated at a high concentration in the string-shaped polyvinylidene chloride filler 38, exfoliate from the ring-shaped polyvinylidene chloride filler 38 and move to the active carbon layer 15. Thereby a large amount of microorganisms also propagate on the active carbon of the active carbon layer 15.

To be brief, it has been found out that the organofluorine compounds can be absorbed into the active carbon and then be decomposed by the activated microorganisms. Thus, the organofluorine compounds are effectively decomposed by the system for filling the first relay tank 5 with the string-like polyvinylidene chloride filler 38, propagating a large amount of the microorganisms therein, and moving them to the active carbon layer 15 for treatment. It is also effective to create water circulation in which the treatment water is repeatedly passed between the first relay tank 5 and the active carbon tower 14.

The first relay tank 5 houses the string-shaped polyvinylidene chloride filler 38. Therefore, the microorganisms are propagated in the string-shaped polyvinylidene chloride filler 38, and can efficiently decompose the organofluorine compounds in the treatment water before being fed to the active carbon tower 14.

The activated microorganisms can be cultivated at a high concentration in the string-shaped polyvinylidene chloride filler 38. Thereby the organofluorine compounds in the treatment water can be treated with more efficiency in the first relay tank 5. The string-shaped polyvinylidene chloride filler 38 can easily be obtained at low cost because it is commercially available.

A lot of the ring-shaped polyvinylidene chloride fillers 38 can easily be housed in the first relay tank 5 because the string-shaped polyvinylidene chloride filler 38 has a string shape.

Fifth Embodiment

Figure 5:
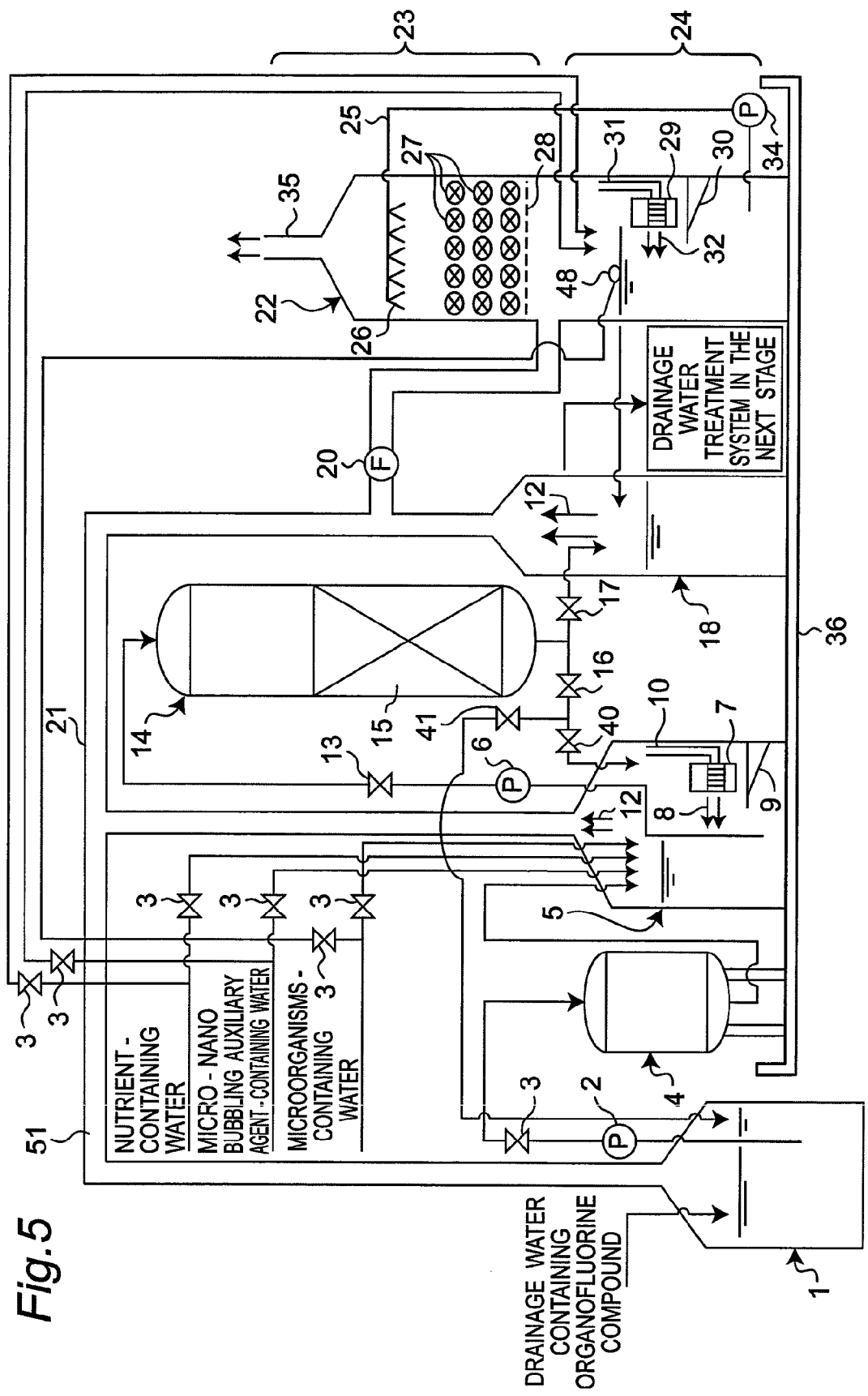
FIG. 5 shows a schematic view of a drainage water-treating apparatus in a fifth embodiment of the invention.

FIG. 5 shows a drainage water-treating apparatus in the fifth embodiment of the invention. The fifth embodiment is different from the first embodiment shown in FIG. 1 in the point that the treatment water and the exhaust gas which has passed through the active carbon tower 14 are introduced into the raw water tank 1, instead of the first relay tank 5, where they are separated into the treatment water and the exhaust gas. In the fifth embodiment, component members identical to those in the first embodiment are designated by identical reference numerals, and the explanation thereof is omitted.

Specifically, the raw water tank 1 is connected to the exhaust gas treatment tank 22 via ducts 51 and 21. The raw water tank 1 is connected to the active carbon tower 4 via a pipe.

A branch line is provided on the downstream side of the valve 16 for the first relay tank, which valve 16 is located downstream of the active carbon tower 14. One end of the branch line is connected to the first relay tank 5 via a valve 40 for the first relay tank. The other end of the branch line is connected to the raw water tank 1 via other valve 41 for the raw water tank.

When the valve 40 for the first relay tank 40 is closed and the valve 41 for the raw water tank is opened, the treatment water and the exhaust gas containing fluoride discharged from the active carbon tower 14 are returned to the raw water tank 1 instead of the first relay tank 5.

The exhaust gas separated in the raw water tank 1 is introduced into the exhaust gas treatment tank 22 via the ducts 51 and 21. On the other hand, the treatment water separated in the raw water tank 1 contains the microorganisms activated by the micro-nano bubbles. Thereby, the organofluorine compounds therein can be removed with a high removal rate. In other words, the treatment water passing through the active carbon tower 14 is introduced into the raw water tank 1 so that the treatment water cane be repeatedly treated.

Sixth Embodiment

Figure 6:
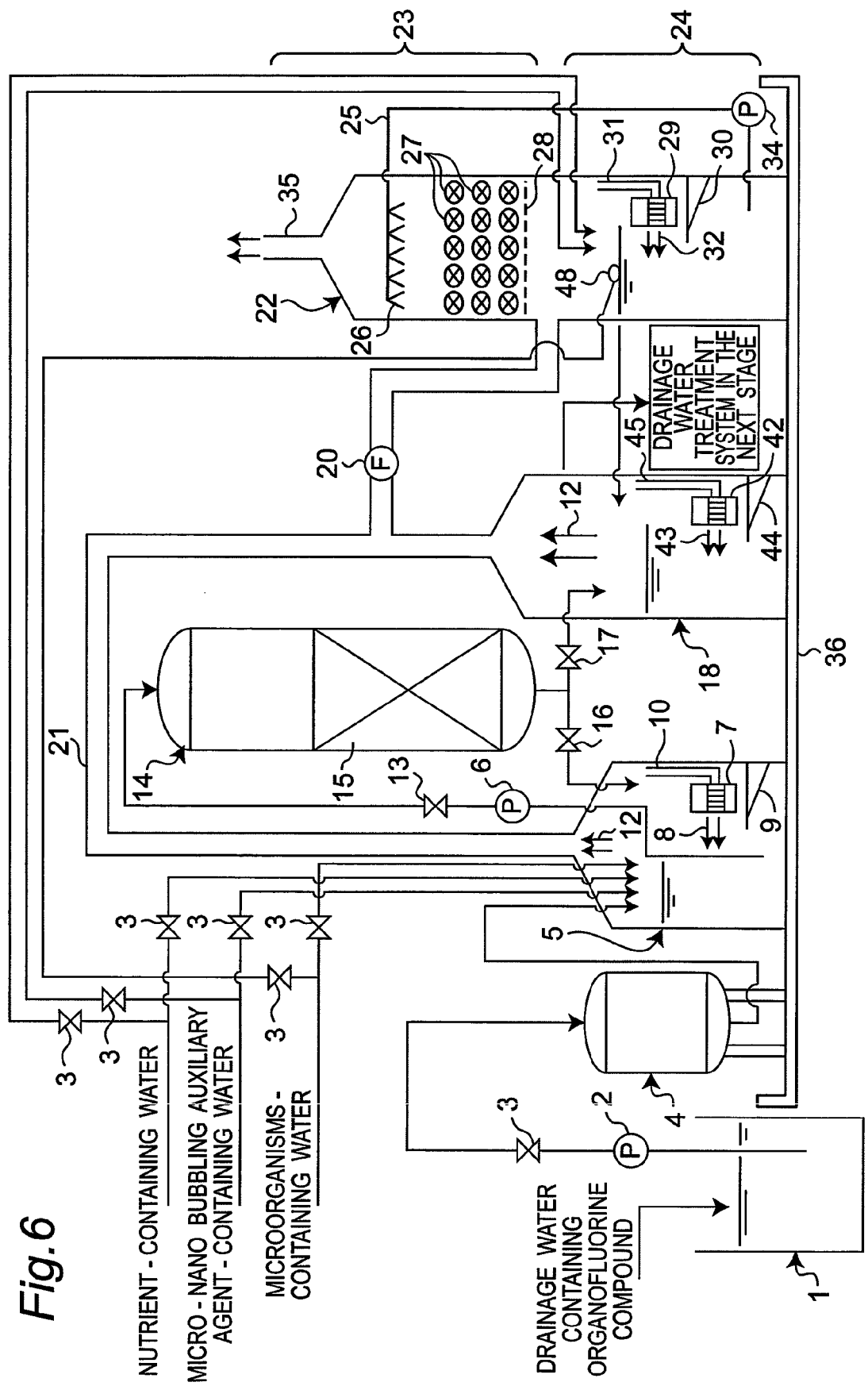
FIG. 6 shows a schematic view of a drainage water-treating apparatus in a sixth embodiment of the invention.

FIG. 6 shows a drainage water-treating apparatus in the sixth embodiment of the invention. The sixth embodiment is different from the first embodiment shown in FIG. 1 in the point that a micro-nano bubble generator 42 is housed in the second relay tank 18. In the sixth embodiment, component members identical to those in the first embodiment are designated by identical reference numerals, and the explanation thereof is omitted.

The micro-nano bubble generator 42 is fixed onto a mount 44 provided in the second relay tank 18. The micro-nano bubble generator 42 has the same structure as the micro-nano bubble generator 7 in the first embodiment shown in FIG. 1, and therefore the explanation thereof will be omitted.

The micro-nano bubble generator 42 is connected to an air suction pipe 45. The micro-nano bubble generator 42 sucks air from the air suction pipe 45, so that water and the air create a spiral flow of ultra high-speed. This results in generation of micro-nano bubbles.

In the second relay tank 18, a water stream 43 is generated by fine bubbles discharged from the micro-nano bubble generator 42. The water stream 43 becomes a circulating water stream in the second relay tank 18, which stream agitates the content of the second relay tank 18.

In comparison between treatment water containing micro-nano bubbles and treatment water not containing micro-nano bubbles, it has been confirmed through experiments that the treatment water containing micro-nano bubbles has higher in removal rate of the organofluorine compounds than the treatment water not containing micro-nano bubbles.

This is because the treatment water containing micro-nano bubbles activates the microorganisms and decomposes existing organofluorine compounds.

The second relay tank 18 houses the micro-nano bubble generator 42. Therefore, a slight amount of the organofluorine compounds in the treatment water, which has passed through the active carbon tower 14, can also be decomposed and treated with microorganisms activated in the second relay tank 18.

Seventh Embodiment

Figure 7:
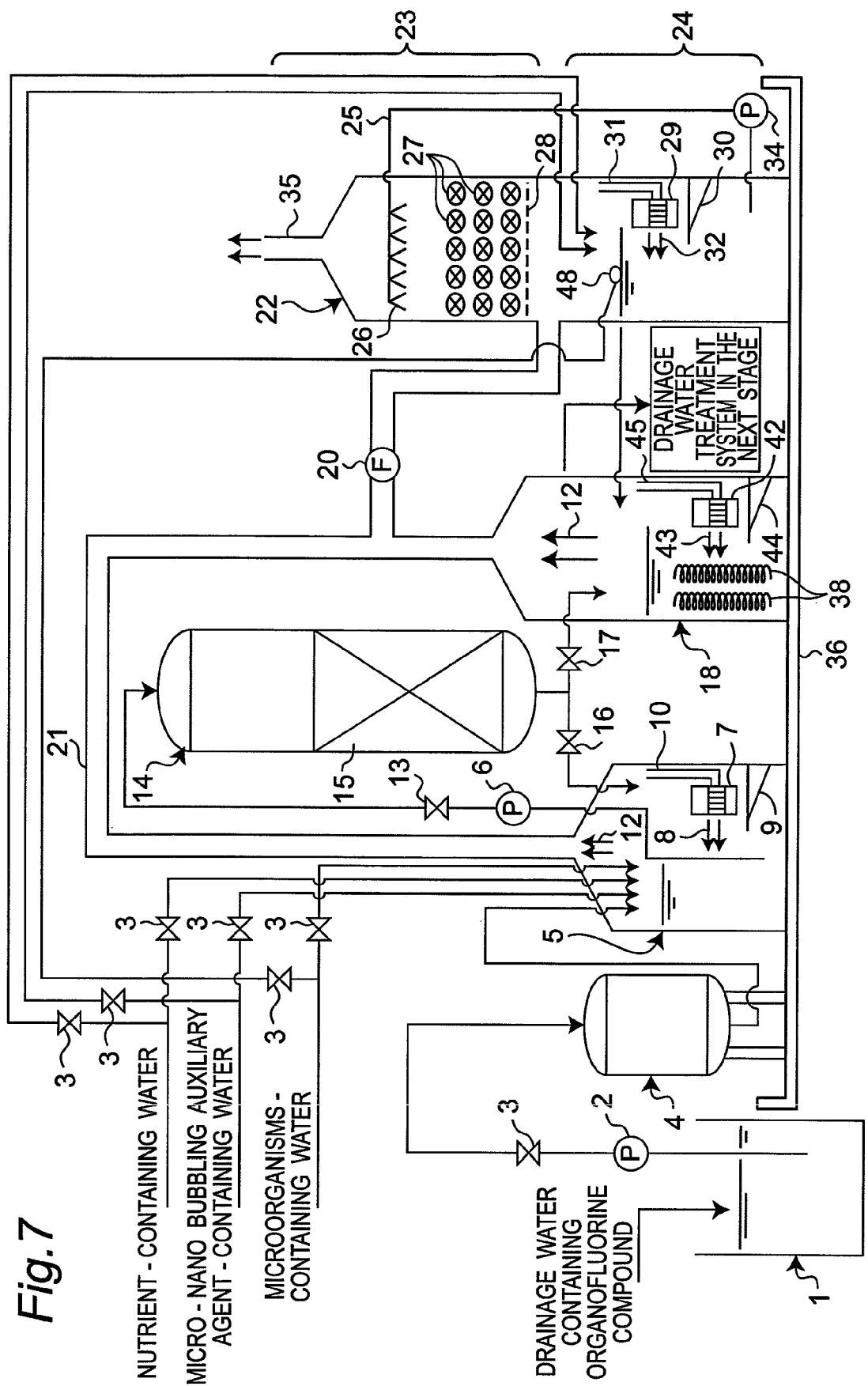
FIG. 7 shows a schematic view of a drainage water-treating apparatus in a seventh embodiment of the invention.

FIG. 7 shows a drainage water-treating apparatus in the seventh embodiment of the invention. The seventh embodiment is different from the first embodiment shown in FIG. 1 in the point that the second relay tank 18 houses the micro-nano bubble generator 42 and a string-shaped polyvinylidene chloride filler 38 as a filler. In the seventh embodiment, component members identical to those in the first embodiment are designated by identical reference numerals, and the explanation thereof is omitted.

The micro-nano bubble generator 42 is fixed onto a mount 44 provided in the second relay tank 18. The micro-nano bubble generator 42 has the same structure as the micro-nano bubble generator 7 in the first embodiment shown in FIG. 1, and therefore the explanation thereof will be omitted.

The micro-nano bubble generator 42 is connected to an air suction pipe 45. The micro-nano bubble generator 42 sucks air from the air suction pipe 45, so that water and the air create a spiral flow of ultra high-speed. This results in generation of micro-nano bubbles.

In the second relay tank 18, a water stream 43 is generated by fine bubbles discharged from the micro-nano bubble generator 42, and the water stream 43 becomes a circulating water stream in the second relay tank 18, which agitates the content of the second relay tank 18.

In comparison between treatment water containing micro-nano bubbles and treatment water not containing micro-nano bubbles, it has been confirmed through experiments that the treatment water containing micro-nano bubbles has higher in removal rate of the organofluorine compounds than the treatment water not containing micro-nano bubbles.

This is because the treatment water containing micro-nano bubbles activates the microorganisms and decomposes existing organofluorine compounds.

The second relay tank 18 houses the micro-nano bubble generator 42. Therefore, a slight amount of the organofluorine compounds in the treatment water, which has passed through the active carbon tower 14, can also be decomposed and treated with microorganisms activated in the second relay tank 18.

The second relay tank 18 houses the string-shaped polyvinylidene chloride filler 38. Thus, the microorganisms are propagated in the string-shaped polyvinylidene chloride filler 38. These microorganisms can efficiently decompose the organofluorine compounds in the treatment water before being discharged from the second relay tank 18.

The activated microorganisms can be cultivated at a high concentration in the ring-shaped polyvinylidene chloride filler 38. Thereby, the organofluorine compounds in the treatment water can more efficiently be treated in the second relay tank 18. The string-shaped polyvinylidene chloride filler 38 can easily be obtained at low cost because it is commercially available.

A lot of the ring-shaped polyvinylidene chloride fillers 38 can easily be housed in the second relay tank 18 because the string-shaped polyvinylidene chloride filler 38 has a string shape.

Eighth Embodiment

FIG. 8 shows a drainage water-treating apparatus in the eighth embodiment of the invention. The eighth embodiment is different from the first embodiment shown in FIG. 1 in the point that the lower reservoir section 24 of the exhaust gas treatment tank 22 houses a string-shaped polyvinylidene chloride filler 38 as a filler. In the eighth embodiment, component members identical to those in the first embodiment are designated by identical reference numerals, and the explanation thereof is omitted.

The string-shaped polyvinylidene chloride filler 38 is housed in the exhaust gas treatment tank 22, Therefore, the microorganisms activated by the micro-nano bubbles can be propagated in the string-shaped polyvinylidene chloride filler 38 while being fixed thereto.

Consequently, the microorganisms are activated and increased in concentration. Thus, the microorganisms can efficiently treat the organic matter which is absorbed in and transmitted to the cleaning water at the same time as the exhaust gas containing fluoride is treated with spraying of the cleaning water.

Specifically, the organofluorine compounds gasified in the decomposition process of the organofluorine compounds are washed by and absorbed into the cleaning water, and decomposed by the activated microorganisms propagating in the string-shaped polyvinylidene chloride filler 38.

Also, a lot of the string-shaped polyvinylidene chloride fillers 38 can be housed in the lower reservoir section 24 of the exhaust gas treatment tank 22.

Experimental Example

An experimental apparatus corresponding to the first embodiment of FIG. 1 was manufactured. In this experimental apparatus, the capacity of the raw water tank 1 was about 4 $m^3$. The capacity of the filtration device 4 was about 1 $m^3$. The capacity of the first relay tank 5 was about 1 $m^3$. The capacity of the active carbon tower 14 was about 2 $m^3$. The capacity of the second relay tank 18 was about 1 $m^3$. The entire capacity of the exhaust gas treatment tank 22 was about 3 $m^3$. A trial run was conducted for one month when drainage water containing organofluorine compounds were introduced into the raw water tank 1, and when water containing the microorganisms, water containing the micro-nano bubble generation auxiliary agent, and water containing the nutrient were introduced into the first relay tank 5 and the lower reservoir section 24 of the exhaust gas treatment tank 22.

After the trial run, PFOS (perfluorooctane sulfonate) concentrations were measured both in an inlet port of the raw water tank 1 and in an outlet port of the second relay tank 18, so that the removal rate of PFOS was 96%. The conclusion is that persistent PFOS can effectively be decomposed by microorganisms.

The present invention shall not be limited to the above-stated embodiments. For example, a ring-shaped polyvinylidene chloride filler in the fourth, seventh and eighth embodiments may be substituted for the string-shaped polyvinylidene chloride filler 38. The ring-shaped polyvinylidene chloride filler can easily be housed in the first relay tank 5, the second relay tank 18 and the exhaust gas treatment tank 22. In the first to eighth embodiments, the string-like polyvinylidene chloride filler 38 and/or the ring-shaped polyvinylidene chloride filler may be housed in at least any one of the first relay tank 5, the second relay tank 18, and the exhaust gas treatment tanks 22.

The invention claimed is:

1. A drainage water-treating method, comprising the steps of:
    propagating microorganisms on active carbon, the microorganisms having been activated with micro-nano bubbles and a nutrient; and
    bringing drainage water containing organofluorine compounds into contact with the active carbon so as to absorb the organofluorine compounds in the drainage water to the active carbon, and then to decompose the organofluorine compounds absorbed into the active carbon with use of the microorganisms.

2. A drainage water-treating method, comprising the steps of:
    filtering drainage water containing organofluorine compounds;
    mixing microorganisms, a micro-nano bubble generation auxiliary agent and a nutrient into the filtered drainage water while adding micro-nano bubbles to the filtered drainage water so as to produce treatment water; and
    feeding the treatment water to an active carbon tower which houses active carbon so as to decompose the organofluorine compounds in the treatment water with use of the microorganisms.

* * * * *